United States Patent [19]

Smith et al.

[11] Patent Number: 4,948,155

[45] Date of Patent: Aug. 14, 1990

[54] APPARATUS FOR EXTENDING AND RETRACTING THE REAR WHEELS OF A TRAILER

[75] Inventors: Fred T. Smith; Fred P. Smith, both of Alpine, Utah

[73] Assignee: Redwood Reliance Sales Company, Cotati, Calif.

[21] Appl. No.: 306,781

[22] Filed: Feb. 3, 1989

[51] Int. Cl.⁵ .................. B60P 1/18; B62D 27/04; B62D 53/06
[52] U.S. Cl. .................. 280/149.2; 298/22 AE; 414/475
[58] Field of Search ............... 298/17 B, 17 S, 22 AE; 280/149.2; 414/475

[56] References Cited

U.S. PATENT DOCUMENTS

| | | | |
|---|---|---|---|
| 2,682,419 | 6/1954 | Wolf | 280/149.2 |
| 2,753,064 | 7/1956 | Lesser | 414/475 |
| 2,861,837 | 11/1958 | Morse | 298/22 AE |
| 2,868,583 | 1/1959 | Harbers et al. | 298/22 AE |
| 2,997,342 | 8/1961 | Talbert | 298/17 S |
| 3,055,710 | 9/1962 | Black | 298/22 AE |
| 3,181,914 | 5/1965 | Humes | 280/149.2 |
| 3,931,987 | 1/1976 | Holliday | 280/149.2 |
| 4,033,625 | 7/1977 | Fikse | 280/149.2 |
| 4,660,843 | 4/1987 | Hicks | 414/475 |

Primary Examiner—David H. Brown
Attorney, Agent, or Firm—Ellsworth R. Roston; Charles H. Schwartz

[57] ABSTRACT

A trailer has a trailer body, pairs of rear wheels at opposite sides of the trailer and hydraulics for tilting the forward end of the trailer body upwardly to dump the load in such body. The trailer dumps the load in a retracted position of the wheels. To increase the load which such body can carry while travelling, the rear wheels of the trailer are movable to extended positions. To provide for the extension and retraction of the rear wheels and facilitate the dumping of the load, a member is attached at a first end to leaf springs between the wheels and at a second end to the trailer. At an intermediate position, the member is attached to a rod extensible and retractible relative to a hydraulic cylinder to extend or retract the first end of the member and the wheels about the attachment at the second end as a fulcrum. The cylinder is attached to the trailer forwardly of the attachment of the member to the trailer at the second end. The member is initially pivotable about the first end as a fulcrum when the forward end of the trailer is tilted upwardly. The member subsequently engages the axle of the rearmost wheel during such upward tilting to provide for the pivotal movement of the member of such axle and for a support of the rear end of the trailer body during such tilting. The cylinder and rod are included in a hydraulic circuit with valve members to provide for a controlled extension and retraction of the rear wheels.

33 Claims, 4 Drawing Sheets

APPARATUS FOR EXTENDING AND RETRACTING THE REAR WHEELS OF A TRAILER

This invention relates to trailers in which the rear wheels are extensible to provide for the transport of an increased load in the body of the trailer and are retractible to provide for a dumping of the load from the truck body at any desired location. More particularly, the invention relates to apparatus for extending and retracting the rear wheels of the trailer and for facilitating the upward tilting of the forward end of the trailer body with the wheels retracted to provide for the dumping of the load from the trailer body.

Trailers have been in existence for some time to transport load to any desired location and to dump the loads at such desired location. The loads are carried in a trailer body which is tilted upwardly at its forward end relative to the trailer to dump the loads in the trailer body. The loads may be any material, preferably solid, such as rocks or dirt. The upward tilting of the forward end of the trailer body is provided hydraulically such as by the extension of a rod from a hydraulic cylinder.

In order to increase the loads which the trailers can carry, apparatus has been provided for extending the rear wheels of the trailers. By extending the rear wheels of the trailers, the loads in the trailer bodies can be increased without violating any state or federal laws relating to truck loads on highways. When the trailer has reached the desired location, the apparatus retracts the rear wheels. With the rear wheels retracted, the load in the trailer body is dumped at the desired location.

The apparatus now in use has certain significant disadvantages which seriously restrict its use. The apparatus is quite complicated and not easy to operate. Furthermore, it is not reliable in operation. It also adds considerable weight to the trailer, thereby restricting the amount of additional load which the trailer body can carry.

The disadvantages discussed above have been known for some time. A considerable effort has been made, and substantial sums of money have been expended, to overcome these disadvantages. In spite of such efforts and such money expenditures, such disadvantages continue to exist in the apparatus now in use.

This invention provides apparatus for extending the rear wheels of a trailer between extended and retracted positions. The invention has a minimal number of parts and operates on a reliable basis in spite of its simple construction. The apparatus has a relatively low weight so that it provides for an optimal increase in the load in the trailer body when the rear wheels of the trailer are extended. The apparatus of this invention is further advantageous in cooperating with the trailer to facilitate the dumping of the load from the trailer body when the rear wheels are in the retracted position.

In one embodiment of the invention, a trailer has a trailer body, pairs of rear wheels at opposite sides of the trailer and hydraulics for tilting the forward end of the trailer body upwardly to dump the load in such body. The trailer dumps the load in a retracted position or the wheels to increase the load which such body can carry while travelling, the rear wheels of the trailer are movable to extended positions.

To provide for the extension and retraction of the rear wheels and facilitate the dumping of the load, a member is attached at a first end to leaf springs between the wheels and at a second end to the trailer. At an intermediate position, the member is attached to a rod which is extensible and retractible relative to a hydraulic cylinder to extend or retract the first end of the member and the wheels about the attachment at the second end as a fulcrum. The cylinder is attached to the trailer forwardly of the attachment of the member to the trailer at the second end.

The member is initially pivotable about the first end as a fulcrum when the forward end of the trailer is tilted upwardly. The member subsequently engages the axle of the rearmost wheel during such upward tilting to provide for the pivotal movement of the member on such axle and to provide for a support of the rear end of the trailer body during such tilting. The hydraulic cylinder and rod are included in a hydraulic circuit with valve members to provide for a controlled extension and retraction of the rear wheels.

The invention has other important advantages. It provides for an extension or retraction of the rear wheels of the trailer while the trailer is moving. Furthermore, the rear wheels are locked in the extended or retracted position by the hydraulic cylinder and the rod and by the weight of the trailer body. This eliminates any necessity of providing members solely for the purpose of locking the rear wheels to the extended or retracted positions.

Figure 10:
Figure 9:
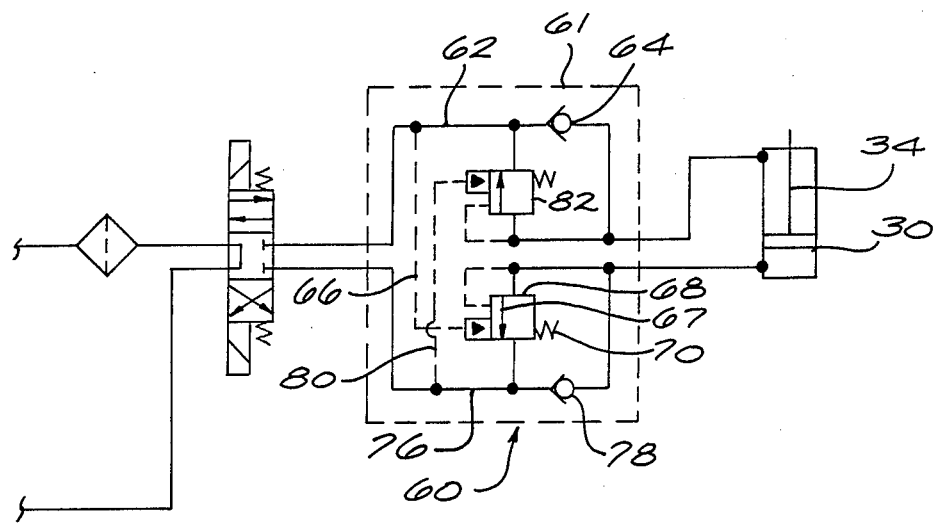

FIG. 9 is a diagram of a portion of a hydraulic circuit for controlling the operation of the apparatus of this invention in moving the rear wheels on the trailer between the retracted and extended positions; and FIG. 10 is a diagram schematically illustrating the movement of one of the members in the apparatus of this invention when the wheels are moved between the retracted and extended positions.

In one embodiment of the invention, a trailer generally indicated at 10 is provided with pairs of rear wheels 12 having axles 14. Leaf springs 15 are disposed in a conventional manner between the rear wheels 12 to dampen the response of the trailer 10 to the vertical movements of the rear wheels 12 when the rear wheels encounter bumps in the road.

Figure 1:
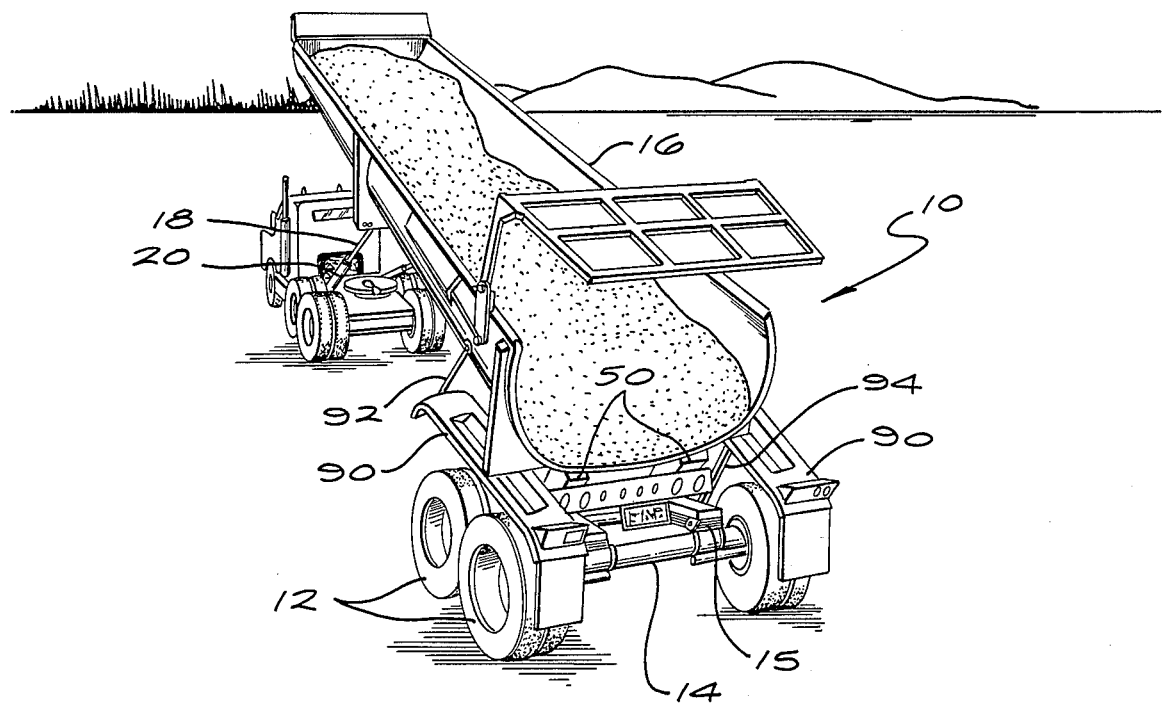
FIG. 1 is a schematic perspective view of a trailer in a position for dumping a load in a trailer body at a preselected site and of apparatus constituting this invention for facilitating such dumping.
Figure 2:
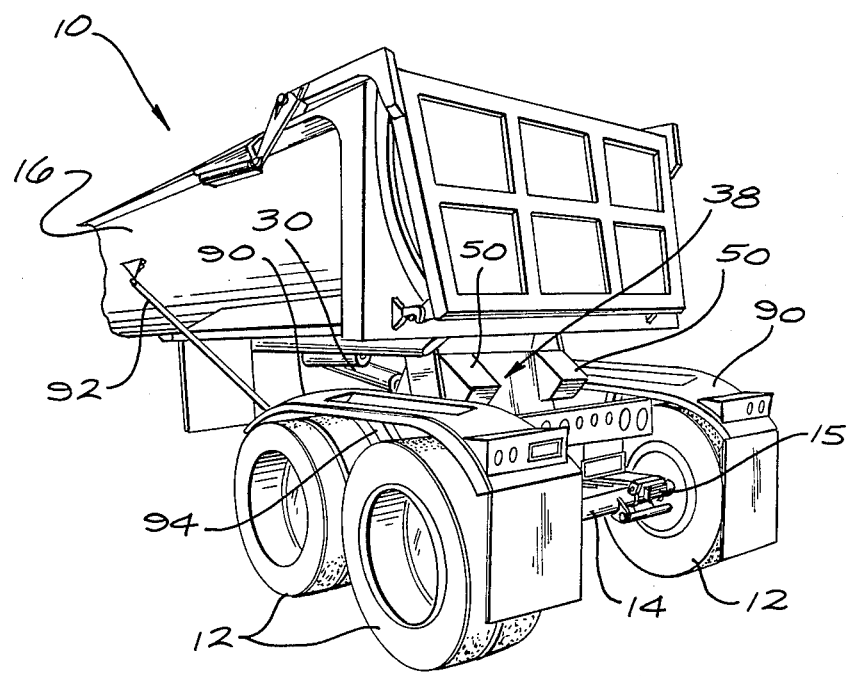
FIG. 2 is a fragmentary perspective view of the rear end of the trailer shown in FIG. 1 and illustrates the apparatus of the this invention in additional detail.
Figure 3:
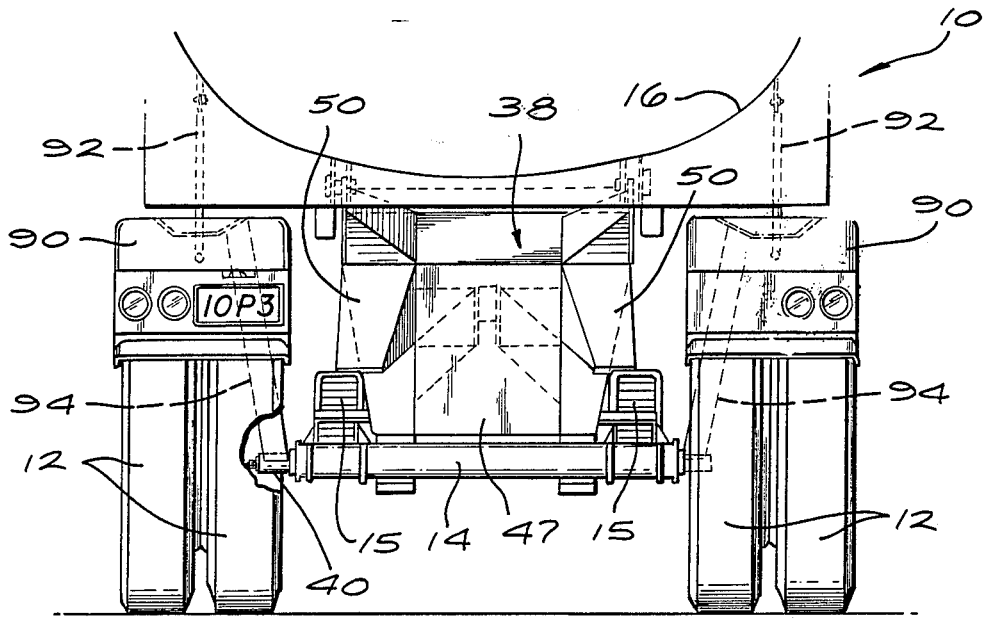
FIG. 3 is a rear elevational view of the trailer shown in FIGS. 1 and 2 and of the apparatus constituting this invention.

A trailer body 16 is disposed on the trailer 10 to carry a load. The load may be any material, preferably solid, such as dirt, rocks or asphalt. The trailer 10 may be driven to any desired location and the load in the trailer body 16 may then be dumped at the desired location. The dumping may be accomplished by extending a rod 18 (FIG. 1) upwardly from a hydraulic cylinder 20 at the forward end of the trailer. This causes the trailer body 16 to be tilted in a direction such that the load in the trailer body 16 is ejected from the rear end of the trailer body.

It is often desirable to provide the trailer body 16 with the ability to carry an increased load. For example, by extending the rear wheels 12 by a distance of approximately four (4) feet, the weight of the load carried by the trailer body 16 can be increased by approximately one (1) ton. This represents an increase of more than seven percent (7%) in the weight that the trailer body 16 can otherwise carry.

In order to distribute the weight of the trailer 10, the trailer body 16 and the load over an increased distance, the rear wheels 12 are often extended rearwardly. This provides for the weight to be distributed over an increased length in a manner which will meet city, state and federal regulations. When the load in the trailer body 16 is to be dumped, the rear wheels 12 are retracted. This allows the forward end of the trailer body 16 to be tilted so that the load can be dumped from the rear of the trailer body.

This invention provides apparatus for displacing the rear wheels 12 in the trailer 10 between extended and retracted positions. The apparatus of this invention also cooperates with the trailer 10 in the retracted position of the wheels 12 in supporting the trailer body 16 while the forward end of the trailer body 16 is being tilted upwardly to dump the load from the rear end of the trailer body.

The apparatus of this invention includes a hydraulic cylinder 30 (FIGS. 4-8) pivotally supported on the trailer 10 by a pin 32 at a forward position on the trailer. A rod 34 is movable in the cylinder 30 between extended and retracted positions. The cylinder 30 and the rod 34 may be considered as drive means. The rod 34 is pivotably attached as by a pin 36 to a member generally indicated at 38, at an intermediate position along the height of the member. The member 38 is also pivotably attached at one end as by a pin 40 to a retainer 42 which extends around the leaf springs 15 to hold the leaf springs in a tight relationship. At its opposite end, the member 38 is pivotably attached as by a pin 46 to the trailer 10. As will be seen, the pin 46 is disposed rearwardly of the pin 32.

Figure 6:
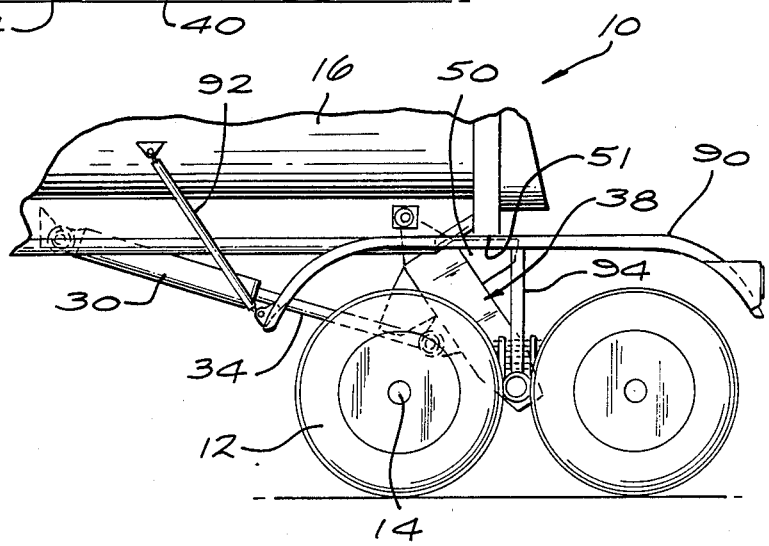
FIG. 6 is a fragmentary side elevational view, similar to that shown in FIGS. 4 and 5, of the trailer and the apparatus of this invention, with such rear wheels extended rearwardly through the full distance by such apparatus.
Figure 7:
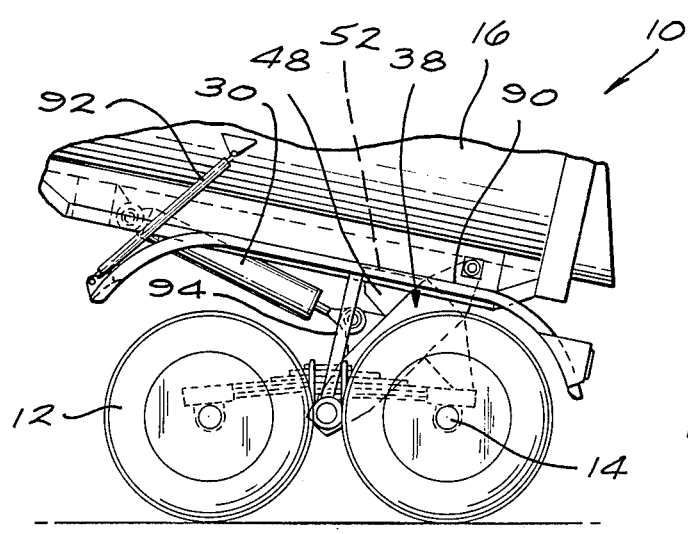
FIG. 7 is a fragmentary side elevational view, similar to that shown in FIGS. 4–6, of the trailer and the apparatus of this invention, with the rear wheels of the trailer in the retracted position and with trailer body tilted partially to the position for dumping the load in the trailer body.
Figure 8:
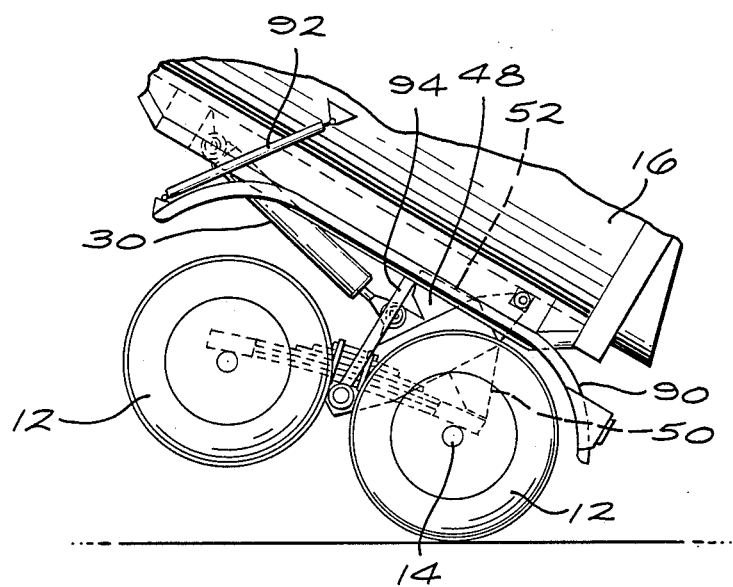
FIG. 8 is a fragmentary side elevational view, similar to that shown in FIG. 7, of the trailer and the apparatus of this invention, with the trailer body fully tilted to the position for dumping the load from the trailer body.

The member 38 has a body portion 47 and pair of wing portions 48 and 50 which extend from opposite sides of the body portion. The upper surface 52 of the wing portion 48 is disposed in flush relationship against the underside of the trailer 10 with the wheels 12 in the retracted relationship. Because of its disposition against the underside of the trailer 10, the wing portion 48 prevents the axle of the front one of the wheels 12 from bouncing against the rod 34 in the extended position of the rear wheels 12 as shown in FIG. 6. This prevents the rod 34 from being damaged.

The wing portion 50 extends downwardly and rearwardly from the member 38 with the wheels 12 in the retracted position. This is important in case the rod 34 should ever break, particularly when the rear wheels are in the extended position shown in FIG. 6. Under such circumstances, the wing portion 50 abuts a support member 51 on the trailer to provide a support for retaining the apparatus in the position shown in FIG. 6.

When it is desired to extend the wheels 12 rearwardly, the rod 34 is extended from the cylinder 30. This causes the member 38 to pivot in a counterclockwise direction about the pivot pin 46 as a fulcrum. Since the member 38 is coupled by the pin 40 and the retainer 42 to the leaf springs 14, the wheels 12 move rearwardly as the member 38 pivots counter-clockwise on the pivot pin 46 as a fulcrum. This is shown by the progressive positions of the member 38 with the wheels 12 in the retracted position in FIG. 4, in the partially extended position in FIG. 5 and in the extended position in FIG. 6. In like manner, the member 38 pivots in a clockwise direction on the pivot pin 46 as a fulcrum in accordance with the retraction of the rod 34. This causes the wheels 12 to retract to the position shown in FIG. 4.

Figure 4:
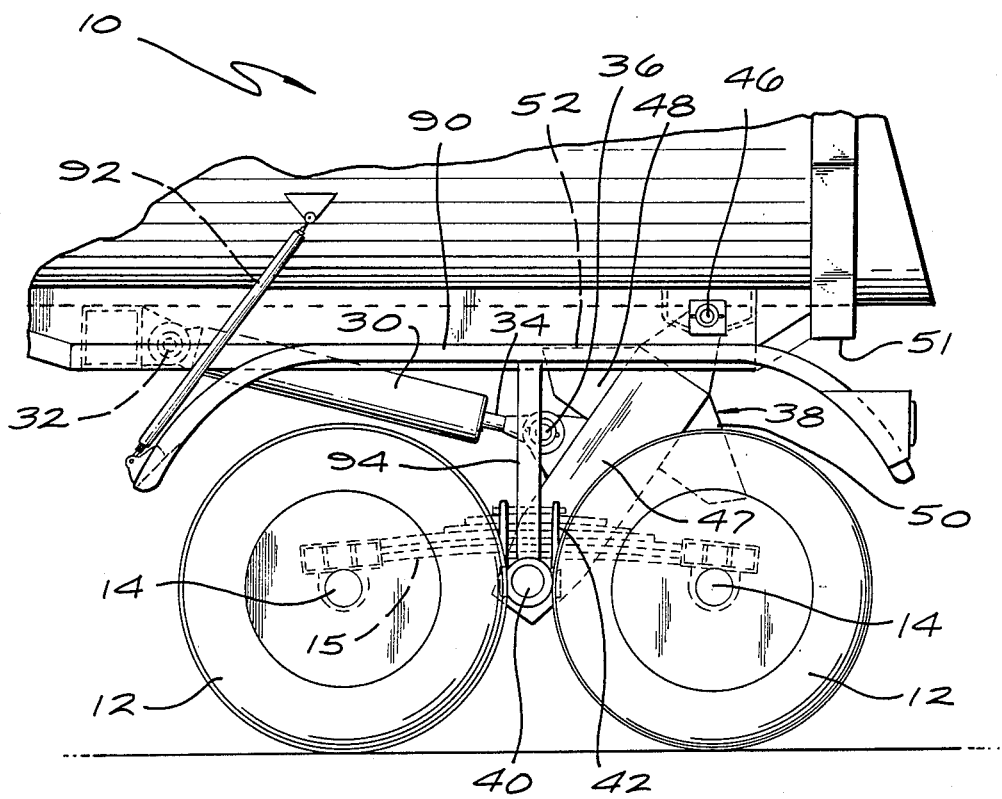
FIG. 4 is a fragmentary side elevational view of the trailer shown in the previous Figures and of the apparatus of this invention, with such apparatus operative to retain the rear wheels of the trailer in a retracted position.

When the wheels 12 are in the retracted position shown in FIG. 4, the rod 18 may be extended from the cylinder 20 to tilt the forward end of the trailer body 16 upwardly. During such upward tilting of the trailer body 16, the member 38 pivots in a clockwise direction about the pivot pin 40 as a fulcrum. When the body 16 has rotated sufficiently in the clockwise direction, the wing portion 50 engages the axles of the rearmost wheels 12. The member 38 thereafter pivots about this axle 14 as a fulcrum as the forward end of the trailer body 16 continues to be tilted upwardly. The member 38 accordingly acts to brace the rear end of the trailer body 16 as the forward end of the trailer body 16 is tilted upwardly.

As the rear wheels 12 are moved between the retracted and extended positions, the pivot pin 40 moves through a segment of a circle. In the upper half of this circle, the rod 34 would tend to move relatively quickly toward its limit of movement unless contraints are provided in a hydraulic circuit associated with the cylinder 30 and the rod 34 to control such movement. Such constraint is provided by a valve assembly generally indicated at 60 in FIG. 9.

In FIG. 9, the hydraulic cylinder 30 and the rod 34 are shown as being associated with a valve generally indicated at 60, the valve being shown within broken lines 61. When the rod 34 is to be retracted, fluid initially flows through a hydraulic circuit including a line 62 and a check valve 64 to the rod end of the cylinder 30. At the same time, the fluid in a line 66 (indicated in broken lines in FIG. 9) exerts a pressure on a movable member 67 in a valve 68 against the action of a spring 70 to open the valve and complete the hydraulic circuit. The fluid flows in this manner while the member 38 rotates through the first half of its pivotal movement between the extended and retracted positions of the wheels 12, as schematically illustrated at 72 in FIG. 10.

In the second half of the pivotal movement of the member 38 as indicated at 74 in FIG. 10, the pressure of the fluid in the line 62 is relatively low because of the increasing ease of the rod 34 in driving the wheels to the retracted position. This pressure initially prevents the valve 68 from opening. However, the pressure of the fluid in the line 66 increases because the valve 68 is not open. When the pressure has accumulated somewhat, the valve 68 partially opens to provide for a controlled flow of fluid through the valve. This causes the movement of the wheels 12 to be constrained by the action of the valve 68 in the second half 74 of the movement of the member 38.

When the wheels 12 are moved from the retracted position to the extended position, fluid flows through a line 76 and a check valve 78 to the cylinder 30. This fluid acts through a line 80 on a valve 82 to open the valve for the flow of fluid. In the second half of the movement of the wheels 12 to the extended position, the valve 80 becomes partially opened to control the movement of the wheels in a manner similar to that described in the previous paragraph.

The apparatus of this invention has certain important advantages. It provides for a movement of the rear wheels of a trailer between retracted and extended positions. This movement can be provided while the trailer is moving. In the extended position of the rear wheels 12, the trailer body 16 is able to carry an increased load. In the retracted position of the rear wheels 12, the load in the trailer body 16 can be dumped efficiently. While the load in the trailer body 16 is being dumped, the apparatus of this invention acts to support the trailer body 16 relative to the trailer 10 to facilitate the dumping.

The apparatus of this invention acts on a positive and reliable basis to provide the operations discussed above. Furthermore, the apparatus of this invention acts to lock the rear wheels in the extended or retracted position without any necessity of providing members solely for the purpose of providing the locking operation. The apparatus of this invention also acts to prevent members, such as a rod associated with a hydraulic cylinder, from being damaged by the bouncing of the rear wheels and also acts to maintain the apparatus in locked relationship even if the rod should fail. The apparatus of this invention is also relatively low in weight, thereby providing for an optimal increase in the load which can be carried by the trailer body 16 with the rear wheels 12 in the extended position.

Figure 5:
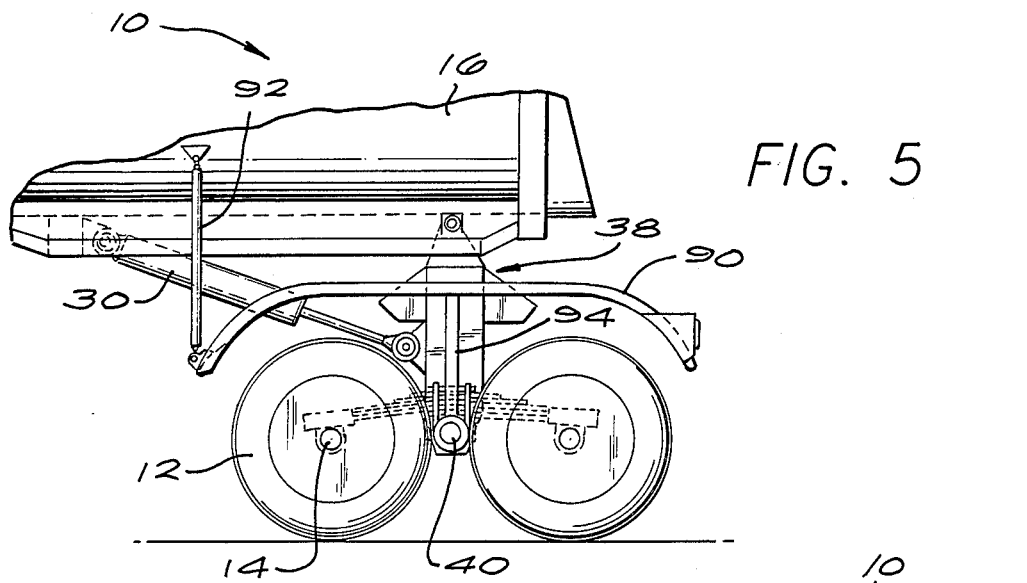
FIG. 5 is a fragmentary side elevational view, similar to that shown in FIG. 4, of the trailer and the apparatus of this invention, with the rear wheels extended rearwardly by such apparatus through a portion of the distance through which the rear wheels can be extended.

FIGS. 4, 5 and 6 indicate an arrangement disposed in co-operative relationship with the apparatus disclosed above for holding fenders 90 in position relative to the rear wheels 12 and for allowing movement of the fenders with the rear wheels between the extended and retracted positions of the rear wheels. Such an arrangement includes a link 92 pivotally attached at one end to the trailer 10 and at the other end to the fender 90. A support 94 is attached at one end to the fender 90 at an intermediate position along the length of the fender and at the other end is attached to the pin 40. In this way, the fender 90 is able to move with the rear wheels 12 between the retracted position shown in FIG. 4 and the extended position shown in FIG. 6.

The arrangement described above and shown in FIGS. 11 and 12 is advantageous because it supports the fender 90 on a positive basis so that the fender is positively supported, without rattling, relative to the trailer 10 and the axles 14. The arrangement is also advantageous because it provides on a positive basis for a movement of the rear wheels 12 between the retracted position shown in FIG. 4 and the extended position shown in FIG. 6. The arrangement also retains the fenders permanently in fixed position on the wheels without the fenders falling from the wheels as in the prior art.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination,
a trailer,
a pair of rear wheels disposed on the trailer and displacable between retracted and extended positions,
drive means operable between first and second positions,
pivot means operatively coupled to the trailer and pivotable in accordance with the operation of the drive means between the first and second positions,
spring means operatively coupled to the rear wheels for cushioning the trailer relative to changes in vertical position of the rear wheels and for providing for a displacement of the rear wheels between the retracted and extended positions,
coupling means operatively coupled to the drive means and the spring means during the movement of the trailer and pivotably coupled to the pivot means for providing a displacement of the spring means and the rear wheels between the retracted and extended positions in accordance with the operation of the drive means between the first and second positions and the pivotal operation of the pivot means while the trailer is moving.

2. In a combination as recited in claim 1,
means included in the drive means and disposed relative to the trailer in the extended position of the rear wheels for providing a support for the drive means in the second position of the drive means in case of any damage to the drive means.

3. In a combination as set forth in claim 1,
fenders associated with the pairs of rear wheels, and
means operatively coupled to the fenders, the trailer and the rear wheels for retaining the fenders in fixed position relative to the rear wheels and for allowing movement of the fenders with the rear wheels between the extended and retracted positions of the rear wheels.

4. In a combination as set forth in claim 1,
the trailer having a body,
the coupling means including second pivot means,
means in the trailer for tilting the forward end of the trailer body upwardly to dump the contents in the trailer body, and
means responsive to the tilting of the forward end of the trailer body upwardly for providing a pivotal movement of the coupling means relative to the second pivot means as a fulcrum against the axle of the rearmost wheel in each pair to facilitate the upward tilting of the trailer body.

5. In a combination as set forth in claim 4,
the coupling means being coupled to the drive means between the first and second pivot means.

6. In a combination as set forth in claim 5,
the drive means being hydraulic, and means included in a hydraulic circuit with the hydraulic drive means for providing a controlled action on the coupling means to produce a controlled displacement of the rear wheels between the retracted and extended positions.

7. In a combination as recited in claim 6,
fenders associated with the pairs of rear wheels and having forward and rearward positions, and
means operatively coupled to the fenders, the trailer and the rear wheels for retaining the fenders in fixed position relative to the rear wheels and for allowing movement of the fenders with the rear wheels between the retracted and extended positions of the rear wheels, such coupled means including links pivotally attached at one end to the trailer and at the other end to the fenders at the forward position on the fenders and including members attached at one end to the fender at the rearward position on the fenders and at the opposite end to the axles.

8. Apparatus for use in providing a controlled displacement of pairs of rear wheels of a trailer between retracted and extended positions, the trailer having a body tiltable upwardly at its forward end, comprising
a member operatively coupled to the trailer at a first position for pivotable movement relative to the trailer about the first position as a fulcrum and operatively coupled to the rear wheels at a second position for pivotable movement relative to the trailer about the second position as a fulcrum, and
drive means movable between first and second positions and operatively coupled to the member for pivoting the member about the first position of the member as a fulcrum in accordance with the operation of the drive means between the first and second positions,
the member being pivotable, during the upward tilting of the forward end of the body, about the second position of the member as a fulcrum to a positions engaging the axle of the rear wheel in the pair and being thereafter pivotable about the axle of such rear wheel as a fulcrum during the continued upward tilting of the forward end of the body.

9. Apparatus as set forth in claim 6, comprising
the drive means being hydraulic, and
the hydraulic drive means being coupled at one end to the member at an intermediate position between the first and second positions of the member and being coupled at the other end to the trailer at a position displaced in the forward direction from the first position of the member.

10. Apparatus as recited in claim 8, comprising
the rear wheels having axles,
spring means coupled at opposite ends to the axles of the rear wheels in the pair, and
means coupling the member to the spring means at a position between the axles of the rear wheels for displacing the spring means and the rear wheels between the retracted and extended positions in accordance with the movement of the drive means between the first and second positions.

11. Apparatus as set forth in claim 10, comprising
means associated with the drive means for providing a controlled displacement of the rear wheels between the retracted and extended positions of the drive means in accordance with the movement of the drive means between the first and second positions of the drive means.

12. Apparatus as set forth in claim 10, comprising
the drive means being coupled at one end to the member at an intermediate position between the first and second positions of the member and being coupled at the other end to the trailer at a position displaced in the forward direction from the first position of the member,
the drive means being hydraulic and being included in a hydraulic circuit for providing a controlled displacement of the rear wheels between the retracted and extended positions of the rear wheels.

13. Apparatus for providing a controlled displacement of pairs of rear wheels of a trailer between retracted and extended positions, the rear wheels having axles and there being leaf springs disposed between the axles of the wheels, the trailer having a trailer body tiltable upwardly at its forward end relative to the trailer, comprising
first means having a body portion and having a first portion extending in a first direction from the body portion for disposition against the trailer and having a second portion extending from the body portion for disposition against the axle of the rearmost wheel in each pair,
second means for operatively coupling the body portion of the first means to the trailer at one end of the body portion for pivotable disposition of the first means relative to the trailer,
third means for operatively coupling the body portion of the first means to the springs at the opposite end of the body portion for pivotable movement of the first means relative to the springs,
the first means being pivotable initially about the third means as a fulcrum during the upward tilting of the forward end of the trailer body to extend the first means to a cooperative arrangement between the second portion of the first means and the axle on the rearmost wheel in each pair and to then provide for a pivotable movement of the first means about such axle with a continued upward tilting of the forward end of the trailer body, and
drive means operatively coupled to the first means for moving the first means between the retracted and extended positions of the first means about the second means as a fulcrum.

14. Apparatus as set forth in claim 13, comprising
the first portion of the first means being disposed in flat relationship against the underside of the trailer in the retracted position of the rear wheels in the pair and during the upward tilting of the trailer body to facilitate the upward tilting of the trailer body and the support of the trailer body by the trailer.

15. Apparatus as set forth in claim 13, comprising
the first portion of the first means being disposed in flat relationship against the underside of the trailer in the retracted position of the rear wheels in the pair to prevent the drive means from being damaged by upward and downward bouncings of the rear wheels.

16. Apparatus as set forth in claim 13, comprising
the second portion of the first means being disposed relative to the trailer in the extended position of the rear wheels to maintain the rear wheels in the extended position upon any damage to the drive means.

17. Apparatus as set forth in claim 13, comprising the second means being attached to the underside of the trailer at a rearward position in the trailer and the drive means being attached to the underside of the trailer at a forward position in the trailer.

18. Apparatus as set forth in claim 17, comprising
the drive means being hydraulic,
the hydraulic drive means including a hydraulic cylinder attached to the underside of the trailer at the forward position in the trailer and further including a rod attached to the body portion of the first means at an intermediate position between the second and third means, and
valve means,
the hydraulic drive means being included in a hydraulic circuit with the valve means to provide a controlled movement of the first means during the pivotable movement of the first means between the retracted and extended positions about the second means as a fulcrum.

19. Apparatus for providing a controlled displacement of pairs of rear wheels of a trailer between retracted and extended positions for facilitating the upward tilting of a forward end of a trailer body on the trailer and for increasing the load capable of being carried by the trailer body, comprising
drive means operable between first and second positions to provide for respective displacements of the rear wheels between the retracted and extended positions,
first means operably coupled to the drive means, the rear wheels and the trailer for displacing the rear wheels between the retracted and extended positions of the rear wheels in accordance with the operation of the drive means between the first and second positions of the drive means and
second means operatively coupled to the first means and responsive to the upward tilting of the forward end of the trailer body on the trailer in the retracted position of the rear wheels for providing a coupling between the trailer and the first means to facilitate the upward tilting of the trailer body on the trailer.

20. Apparatus as recited in claim 19, comprising
third means operatively coupled to the first means and the trailer to provide for the pivotable movement of the first means about the third means as a fulcrum in accordance with the retraction and extension of the drive means.

21. In a combination as set forth in claim 19 wherein
the first means includes means for providing for an operative coupling to the trailer at a first position on the first means for displacing the rear wheels between the retracted and extended positions of the rear wheels in accordance with the operation of the drive means between the first and second positions of the drive means and wherein
the first means includes means for providing for an operative coupling of the first means to the trailer in the retracted position of the rear wheels to facilitate the upward tilting of the trailer body on the trailer.

22. Apparatus as recited in claim 19, comprising
there being leaf springs between the rear wheels in each pair, and
third means for coupling the first means to the leaf springs to provide for the displacement of the rear wheels between the retracted and extended positions in accordance with the retraction and extension of the drive means.

23. Apparatus as recited in claim 22, comprising
the drive means being hydraulic, and
means connected in a hydraulic circuit with the hydraulic drive means for producing a controlled flow of fluid through the hydraulic drive means during the retraction and extension of the hydraulic means to provide a controlled displacement of the rear wheels between the retracted and extended positions.

24. In combination,
a trailer having a trailer body and pairs of rear wheels disposed at opposite sides of the trailer and displaceable between retracted and extended positions and drive means for pivoting the forward end of the trailer body upwardly relative to the trailer,
first means having first and second opposite ends, the second end of the first means being movable between retracted and extended positions,
second means operably coupling the first means to the trailer at the first end of the first means,
third means operably coupling the first means to the rear wheels at the second end of the first means, and
fourth means operatively coupled to the first means for moving the second end of the first means between the retracted and extended positions of the second end of the first means about the second means as a fulcrum to obtain the displacement of the rear wheels of the trailer between the retracted and extended positions of the rear wheels.

25. In a combination as recited in claim 24,
the fourth means including hydraulic means having first and second opposite ends and operatively coupled to the first means at the first end of the hydraulic means and to the trailer at the second end of the hydraulic means, the hydraulic means being movable between retracted and extended positions to retract and extend the second end of the first means and displace the rear wheels about the second means as a fulcrum in accordance with the retraction and extension of the hydraulic means.

26. In a combination as recited in claim 24,
means included in the first means and disposed relative to the trailer in the extended position of the rear wheels for maintaining the rear wheels in the extended position in case of any damage to the fourth means.

27. In a combination as set forth in claim 24,
means included in the first means and disposed relative to the trailer in the extended position of the rear wheels for providing a support for the first means in the extended position of the first means in case of any damage to the drive means.

28. In a combination as set forth in claim 24,
the trailer including an axle for the rear wheels,
means included in the first means and disposed relative to the trailer in the extended position of the rear wheels for preventing the axle from bouncing against the first means.

29. In a combination as set forth in claim 24,
fenders associated with the pairs of rear wheels, and
fifth means operatively coupled to the fenders, the trailer and the third means for retaining the fenders on the rear wheels and for allowing movement of the fenders with the rear wheels between the retracted and extended positions of the rear wheels.

30. In a combination as recited in claim 24,
fifth means included in the first means for engaging the trailer to obtain a pivotal movement of the first means about the third means as a fulcrum during the upward tilting by the drive mean of the forward end of the trailer body on the trailer.

31. In a combination as set forth in claim 30,
the fifth means being disposed against the trailer during the upward tilting by the drive means of the forward end of the trailer to provide support for the rear end of the trailer during such tilting.

32. In a combination as recited in claim 24,
leaf springs between the axles of the rear wheels in each pair,
the third means being operatively coupled to the leaf springs for pivotal disposition of the third means relative to the leaf springs and for displacing the leaf springs and the rear wheels in accordance with the movement of the second end of the first means between the retracted and extended positions of the second end of the first means.

33. In a combination as set forth in claim 32,
fenders associated with the rear wheels and having and having forward and rearward positions, and
fifth means including links operatively coupled at one end to the trailer and at the opposite end to the fenders at the forward position on the fenders and including a member attached at opposite ends to the fenders at the rearward position on the fenders and to the third means.

* * * * *